US012055113B2

(12) United States Patent
Haranahalli Panchakshari

(10) Patent No.: US 12,055,113 B2
(45) Date of Patent: Aug. 6, 2024

(54) APPARATUS AND METHOD FOR CONTROLLING A SENSOR

(71) Applicant: JAGUAR LAND ROVER LIMITED, Warwickshire (GB)

(72) Inventor: Bhanuprakash Haranahalli Panchakshari, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 0 days.

(21) Appl. No.: 17/997,053

(22) PCT Filed: Apr. 27, 2021

(86) PCT No.: PCT/EP2021/060976
§ 371 (c)(1),
(2) Date: Oct. 25, 2022

(87) PCT Pub. No.: WO2021/219633
PCT Pub. Date: Nov. 4, 2021

(65) Prior Publication Data
US 2023/0167780 A1 Jun. 1, 2023

(30) Foreign Application Priority Data
Apr. 27, 2020 (GB) ...................................... 2006148

(51) Int. Cl.
*F02D 41/14* (2006.01)
*F02D 41/06* (2006.01)

(52) U.S. Cl.
CPC ....... *F02D 41/1494* (2013.01); *F02D 41/062* (2013.01)

(58) Field of Classification Search
CPC ........................... F02D 41/1494; F02D 41/062
See application file for complete search history.

(56) References Cited

U.S. PATENT DOCUMENTS

2003/0213795 A1* 11/2003 Toyoda ............... F02D 41/1494 219/490
2010/0212644 A1* 8/2010 Neisen ................ F02D 41/1494 123/685

(Continued)

FOREIGN PATENT DOCUMENTS

JP H0874645 A 3/1996
WO 2016201364 A1 12/2016

OTHER PUBLICATIONS

Combined Search and Examination Report under Sections 17 and 18(3) for Application No. GB2006148.7 dated Sep. 18, 2020.

(Continued)

*Primary Examiner* — Sizo B Vilakazi
(74) *Attorney, Agent, or Firm* — Carlson, Gaskey & Olds, P.C.

(57) ABSTRACT

Embodiments of the present invention provide An oxygen sensor (160) control module (100) for a vehicle, comprising input means (130) for receiving one or more signals (135) indicative of a likelihood of future engine cranking, an output means (140) to provide an output signal (145) to cause activation of a heater (150) associated with the oxygen sensor, and processing means (110) arranged to control, in dependence on the one or more signals (135) indicative of the likelihood of future engine cranking, the output means (140) to provide the output signal (145) to cause activation of the heater (150) associated with the oxygen sensor (160) prior to the engine cranking.

15 Claims, 5 Drawing Sheets

(56) References Cited

U.S. PATENT DOCUMENTS

| | | | | |
|---|---|---|---|---|
| 2011/0224851 | A1* | 9/2011 | Jacques | B60K 6/48 180/65.265 |
| 2019/0048774 | A1* | 2/2019 | Fosaaen | F01N 11/002 |
| 2019/0271279 | A1* | 9/2019 | Ulrey | F02D 41/1494 |
| 2020/0256268 | A1* | 8/2020 | Surnilla | F02D 35/0046 |

OTHER PUBLICATIONS

International Search Report and Written Opinion of the International Searching Authority for International application No. PCT/EP2021/060976 dated Jul. 29, 2021.

* cited by examiner

APPARATUS AND METHOD FOR CONTROLLING A SENSOR

TECHNICAL FIELD

The present disclosure relates to a control method and control module and particularly, but not exclusively, to controlling heating of a gas sensor. Aspects of the invention relate to a control module, to a system, to a vehicle, to a method, and to computer software.

BACKGROUND

Vehicles traditionally have an internal combustion engine (ICE) for providing motive power, but more recently in some cases for alternatively or additionally charging batteries for storing electrical energy which is used to power one or more motors which provide motive power to the vehicle. The ICE may be a petrol or gasoline engine of the vehicle. Emissions from ICEs are a concern and significant efforts are taken to minimise such emissions.

It is an object of embodiments of the invention to at least mitigate one or more of the problems of the prior art.

SUMMARY OF THE INVENTION

Aspects and embodiments of the invention provide a control module, a system, a method, a vehicle and computer software as claimed in the appended claims.

According to an aspect of the present invention, there is provided a gas sensor control module for a vehicle, wherein the control module is arranged to control a heater associated with a gas sensor of an engine of the vehicle to heat the gas sensor prior to the engine cranking. Advantageously the gas sensor is heated to provide a signal indicative of one or more attributes of one or more gasses at a time of the engine cranking.

According to an aspect of the present invention, there is provided an oxygen sensor control module for a vehicle, comprising input means for receiving one or more signals indicative of a likelihood of future engine cranking, an output means to provide an output signal to cause activation of a heater associated with the oxygen sensor, and processing means arranged to control, in dependence on the one or more signals indicative of the likelihood of future engine cranking, the output means to provide the output signal to cause activation of the heater associated with the oxygen sensor prior to the engine cranking. Advantageously, the oxygen sensor is heated prior to engine cranking. Advantageously, the oxygen sensor may be used in closed-loop control of the engine more quickly.

Each of the one or more signals indicative of the likelihood of future engine cranking is optionally based on a respective trigger event. Advantageously, the use of one or more trigger events improves a reliability of timing of the heating of the oxygen sensor.

A first signal indicative of a likelihood of future engine cranking may be received in dependence on a trigger event corresponding to activation of pre-heating of the vehicle. Advantageously, the pre-heating of the vehicle may be indicative of future engine cranking.

A second signal indicative of a likelihood of future engine cranking may be received in dependence on a trigger event corresponding to unlocking of the vehicle. Advantageously, the unlocking of the vehicle may be indicative of imminent engine cranking.

A third signal indicative of a likelihood of future engine cranking may be received in dependence on a trigger event corresponding to opening of a vehicle access aperture. Advantageously, the opening of the vehicle access aperture may be indicative of relatively imminent engine cranking. The vehicle access aperture may be one of a door of the vehicle, boot, a tailgate or a roof of the vehicle.

A signal indicative of a likelihood of future engine cranking is optionally received from a schedule means indicative of a vehicle users schedule, or in dependence on a vehicle users location. Advantageously, the schedule or vehicle user's location may be indicative of future engine cranking.

The processing means may be arranged to control the output means to provide the output signal to cause activation of the heater associated with the oxygen sensor in dependence on receiving a plurality of signals indicative of the likelihood of future engine cranking. Advantageously the use of a plurality of signals may improve a reliability or accuracy of timing of heating of the oxygen sensor.

The plurality of signals indicative of the likelihood of future engine cranking optionally correspond to a plurality of trigger events. Advantageously the use of a plurality of trigger events may improve a reliability or accuracy of timing of heating of the oxygen sensor.

The processing means is arranged to determine a delay period between receiving the one or more signals indicative of the likelihood of future engine cranking and the output of the output signal to cause activation of the heater, and to output the output signal after the delay period. Advantageously the signal is output to cause activation of the heater at an appropriate point in time.

Optionally the processing means is arranged to adaptively update the delay period in dependence on engine cranking history. Adaptively the delay period is updated to improve an accuracy of timing of heating the oxygen sensor.

The heater associated with the oxygen sensor may be activated to heat the oxygen sensor substantially to an operating temperature of the oxygen sensor. Advantageously the oxygen sensor is substantially at the operating temperature for engine cranking.

The heater associated with the oxygen sensor may be activated to heat the oxygen sensor to a preparation temperature lower than an operating temperature of the oxygen sensor. Advantageously the oxygen sensor is heated to the preparation temperature which is sufficient to reduce a time before the oxygen sensor may be used.

The processing means is optionally arranged to determine whether engine cranking has occurred within a predetermined period of time from the output means providing the output signal to cause activation of the heater. Advantageously the processing means determines whether the engine has been cranked and thus the oxygen sensor required. The processing means may control the output means to provide an output signal to cause a reduction in temperature of the heater if engine cranking has not occurred. Advantageously, reducing the temperature of the oxygen sensor may reduce energy consumption and/or improve a lifetime of the oxygen sensor.

According to an aspect of the present invention, there is provided a system comprising the control module of any preceding claim, and an oxygen sensor for measuring one or more oxygen parameters, the sensor being associated with a heater arranged to heat the oxygen sensor in dependence on the output of the control module.

The oxygen sensor is optionally arranged to determine a proportion of oxygen in an atmosphere proximal to the oxygen sensor.

The oxygen sensor may be for measuring oxygen in an exhaust system of the vehicle.

The oxygen sensor is optionally arranged to output a signal indicative of the one or more oxygen parameters prior to the engine cranking.

According to an aspect of the present invention, there is provided a vehicle comprising the controller as described above or the system described above.

According to an aspect of the present invention, there is provided a method of controlling an oxygen sensor of a vehicle, comprising receiving one or more signals indicative of a likelihood of future engine cranking, and controlling in dependence on the one or more signals indicative of the likelihood of future engine cranking, heating of the oxygen sensor prior to the engine cranking.

Each of the one or more signals indicative of the likelihood of future engine cranking may be based on a respective trigger event.

The heating of the oxygen sensor is optionally controlled in dependence on receiving a plurality of signals indicative of the likelihood of future engine cranking.

The method may comprise determining a delay period between receiving the one or more signals indicative of the likelihood of future engine cranking and the controlling the heating of the oxygen sensor, and controlling the heating of the oxygen sensor after the delay period elapses.

The method optionally comprises adaptively updating the delay period in dependence on engine cranking history.

According to an aspect of the present invention, there is provided computer software which, when executed by a computer, is arranged to perform a method as described above. Optionally the computer software is tangibly stored on a computer-readable medium. The computer software may be tangibly stored on the computer readable medium.

Any controller, controllers or control module described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller", "control unit" or "control module" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software saved on one or more memory associated with said controller to be executed on said computational device. A first controller may be implemented in software run on one or more processors. One or more other controllers may be implemented in software run on one or more processors, optionally the same one or more processors as the first controller. Other suitable arrangements may also be used.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

Embodiments of the invention will now be described by way of example only, with reference to the accompanying figures, in which.

DETAILED DESCRIPTION

In order to control combustion with an internal combustion engine (ICE) of a vehicle, it is necessary to monitor one or more attributes of one or more gasses associated with the ICE. To perform such monitoring the ICE is equipped with one or more gas sensors. The gas sensor is a sensor for monitoring at least one attribute of one or more gasses associated with the ICE. The one or more gasses may comprises, without limitation one or more of oxygen, NOx (nitrogen oxide(s)), $NH_3$ (ammonia) etc. For the following description, an oxygen sensor will be referred to with it being understood that embodiments of the present invention may be used with other types of gas sensor.

An oxygen sensor may be associated with an exhaust of the ICE and the sensor arranged for measuring one or more attributes of oxygen present in exhaust gases from the ICE. The oxygen sensor may be a lambda sensor associated with the engine in some embodiments. The oxygen sensor may be arranged to measure a proportion of oxygen present in the exhaust gases from the ICE. The oxygen sensor may be an Exhaust Gas Oxygen (EGO) sensor.

Based on measurements from the oxygen sensor fuel, such as petrol, provided to the ICE can be controlled, as will be appreciated. In some embodiments an amount of fuel provided to the ICE is controlled in dependence on an output of the oxygen sensor. Such control may be referred to as closed-loop control. Since such oxygen sensors only work effectively at elevated temperatures (often an operating temperature of more than 700° C.) it is known for such oxygen sensors to be associated with a heater. Heated oxygen sensors may be referred to as a Heated Exhaust Gas Oxygen (HEGO) sensor or a Universal Heated Exhaust Gas Oxygen (UHEGO) sensor. Until the oxygen sensor is heated to an elevated temperature, if not the operating temperature of the sensor, the ICE may be operated in an open-loop control mode where the fuel provided to the ICE is not controlled based on the measurements of the oxygen sensor. However, during periods of such open-loop control, particularly during cranking of the ICE and for a period of time after starting until closed-loop control is possible, harmful emissions from the ICE may occur or may be particularly increased. For example, during open-loop control, experiments have shown that 40-50% of fuel used during the open-loop control may result in excessive emissions. The period of time of open-loop control may be from up to 5 seconds up to around 45 seconds after starting the ICE before closed-loop control is possible.

Figure 1:
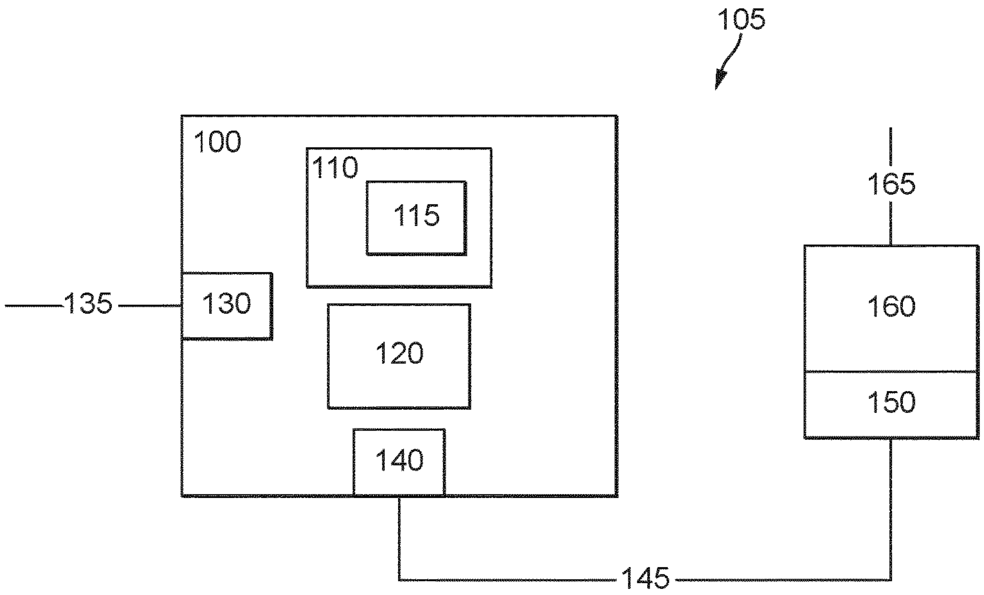
FIG. 1 shows a control module for an oxygen sensors according to an embodiment of the invention.

FIG. 1 illustrates an oxygen sensor 160 control module 100 for a vehicle 700 (not shown in FIG. 1, but shown in FIG. 7) according to an embodiment of the present invention. The control module 100 is arranged to, in use, control heating of the oxygen sensor 160 as will be explained.

The control module 100 comprises a processing means 110 and a data storage means 120. The processing means 110 may be in the form of one or more electronic processors 110. The one or more processors 110 may operatively execute computer-readable instructions which may be stored in the data storage means 120 which may be in the form of one or more memory devices 120. The one or more memory devices 120 may store the computer-readable instructions therein representing a method according to an embodiment of the invention as will be explained.

The control module 100 comprises an input means 130 and an output means 140. The input means 130 is arranged to receive one or more signals 135. The input means 130 may be an electrical input to the control module 100 for receiving one or more electrical signals. The output means 140 is arranged to output at least one signal 145 to cause heating of the oxygen sensor 160. The output means 140 is an electrical output of the control module 100. The output means 140 is operable by the processing means 110 to output the signal 145 under control thereof.

The electrical inputs 130 and outputs 140 of the control module 100 may be provided to/from a communication bus or network of the vehicle, such as a CANBus or other communication network which may, for example, be implemented by an Internet Protocol (IP) based network such as Ethernet, or FlexRay or a Single Edge Nibble Transmission (SENT) protocol, although other protocols may be used.

The signal 135 received by the control module 100 is a signal 135 indicative of a likelihood of future engine cranking. That is, from the signal 135, it is possible to infer that the ICE of the vehicle will be cranked, or turned over, for starting in the near future. For example, near future may be interpreted to mean in a period of time less than 5, 2 or 1 minute, as will be explained.

The oxygen sensor 160 may be one of a lambda sensor, a HEGO sensor or a UHEGO sensor as discussed above. The oxygen sensor 160 may, in use, be associated with or installed to measure gasses present in an exhaust system of the ICE of the vehicle to measure one or more attributes of oxygen in the exhaust gasses of the ICE. The heater 150 is arranged to heat the oxygen sensor 160 responsive to the signal 145. Thus the signal 145 may be referred to as a heating control signal 145. The heater 150 may comprise an electrical heating coil arranged to heat at least a portion of the sensor 160 such as a sensing element of the oxygen sensor 160. The sensing element is, in some embodiments, a ceramic-based sensing element coated with a metallic layer, such as a layer of platinum, although other sensing elements may be used. The heater 150 may be associated with the oxygen sensor 160 to heat the oxygen sensor in dependence on the heating signal 145. The heater 150 may be integral with the oxygen sensor 160, such as a heating coil formed in a ceramic of the oxygen sensor 160 although other configurations are envisaged, such as the heater 150 being proximal to the oxygen sensor 160.

The oxygen sensor 160 is arranged to output an oxygen signal 165 indicate of the one or more attributes of oxygen associated with the ICE. The oxygen signal 165 may be indicative of the proportion of oxygen present in the exhaust gases from the ICE although other attributes indicative of the presence or absence of oxygen in the exhaust gasses may be envisaged.

In some embodiments, the signal 135 indicative of a likelihood of future engine cranking (Likelihood of Future Engine Cranking (LFEC signal 135)) is based, or generated responsive to, at least one trigger event. The trigger event is an event preceding starting of the vehicle's ICE from which it may be inferred that the ICE will be desired to start within a relatively short amount of time i.e. up to 5 minutes etc, as discussed above, although other periods of time may be chosen. In some embodiments, the LFEC signal 135 is indicative of each of a plurality of trigger events, as will be explained, which may advantageously improve an accuracy of heating the oxygen sensor 160.

The LFEC signal 135 may be indicative of opening of a vehicle access aperture. The vehicle access aperture may be one of a door of the vehicle, boot, a tailgate or a roof of the vehicle. The vehicle access aperture may be opened by a user of the vehicle operating a control, such as a button or sensor, a mechanism such as a door handle associated with the access aperture, operating a mobile device such as a mobile phone, or based on a module of the vehicle determining that the user is proximal to the vehicle, such as based upon received wireless signals from the mobile device or a keyfob or other device associated with the vehicle, to cause the access aperture to open.

The LFEC signal 135 is, in some embodiments, indicative of unlocking of the vehicle. The vehicle may be unlocked responsive to a signal wirelessly received from a control device associated with the vehicle, such as a key fob or the like, although it will be realised that the control device may be a computing device such as a mobile phone i.e. smartphone executing control software, such as an 'app', associated with the vehicle. In other embodiments, unlocking of the vehicle may be performed responsive to successful biometric(s) including facial recognition of the user or voice recognition of the user. Other methods of confirming the identity of a user are envisaged.

In other embodiments, the LFEC signal 135 may be provided based on one or more of pre-heating of the vehicle i.e. in dependence on an instruction being received to pre-heat the vehicle, a schedule means (diary) indicative of a vehicle users schedule, for example a diary module indicating that the user has an upcoming appointment and may require the vehicle to travel to the appointment or a vehicle user's location. The vehicle users location may be indicative of the user approaching the vehicle, i.e. on foot, and thus intending to use the vehicle.

The LFEC signal 135 may comprise data identifying the particular event, such as unlocking, door opening etc. In some embodiments the LFEC signal 135 may contain data identifying a time of the event, which may advantageously improve accuracy resulting from delays such as in the signal 135 reaching the module 100 via a communication bus of the vehicle.

In dependence on the LFEC signal 135 being indicative of the one or more trigger events, the processor 110 of the controller 100 is arranged to provide the heating signal 145 to cause activation of the heater 150 associated with the oxygen sensor 160 prior to the ICE cranking. That is, the heating of the oxygen sensor 160 is initiated at, prior to, or at least co-terminus with the ICE being cranked for starting. In this way, the oxygen sensor 160 is heated prior to the ICE being started such that closed-loop control based on the oxygen signal 165 may begin more quickly.

In some embodiments, the processing means 110 may implement a delay determination module (DDR) 115 such as in software operably executed by the processing means. The DDR 115 is arranged to determine a delay, or an expected delay, between one or more trigger events and cranking of the ICE, such that heating of the oxygen sensor 160 can be commenced at a corresponding time as will be explained. In some embodiments the DDR 115 is adaptive, that is the expected delay is at least periodically updated. The DDR 115 may be based upon an artificial intelligence algorithm such as a neural network to learn the expected delay, which may vary between users of the vehicle.

Figure 2:
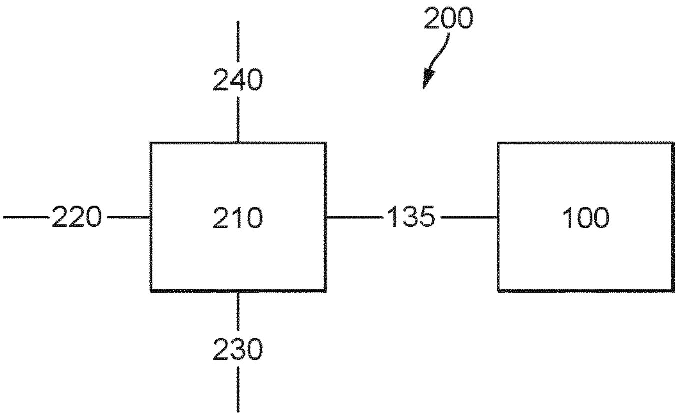
FIG. 2 shows a system comprising the control module according to an embodiment of the invention.

FIG. 2 illustrates a system 200 comprising the control module 100 described above. The system 200 comprises a further control module 210 of the vehicle arranged to provide the LFEC signal 135. The further control module 210 may be a body control module (BCM) 210 of the vehicle, although the LFEC signal 135 may be provided from other sources such as other control modules of the vehicle. The BCM 210 is arranged to receive one or more signals 220, 230, 240 each indicative of a respective trigger event. In an example embodiment, a first signal 220 is indicative of unlocking of the vehicle, a second signal 230 is indicative of opening of the vehicle access aperture and a third signal 240 is indicative of pre-heating of the vehicle. It will be appreciated that other, or additional signals, may be received by the BCM 210 and, furthermore, the plurality of signals 220, 230, 240 may be provided to the BCM 210 via one input i.e. from the communication bus of the vehicle. Furthermore, in some embodiments used with hybrid vehicles, the LFEC signal 135 is provided which is indicative of cranking the ICE whilst the vehicle is operative by electric power. For example, in such hybrid vehicles, when the vehicle is pulls away under electric power alone i.e. motive power provided from an electric machine, a signal from a vehicle control unit or the BCM 210 indicates a time remaining to battery drain or time remaining to start ICE (shift from electric-drive to ICE). In this case, embodiments of the invention are arranged to provide the heating signal 145 to cause activation of the heater 150 prior to the ICE cranking whilst the vehicle is operative under the electric motive power.

The BCM 210 is arranged to generate the LFEC signal 135 in dependence on one or more of the received signals 210, 220, 230. The LFEC signal 135 may be indicative of each of the received signals 210, 220, 230 i.e. by the LFEC signal 135 providing an indication of an event type, such as door opening, vehicle unlocking etc, to the control module 100. In some embodiments, the signals 210, 220, 230 may be provided directly to the control module 100 as the LFEC signal 135.

Figure 3:
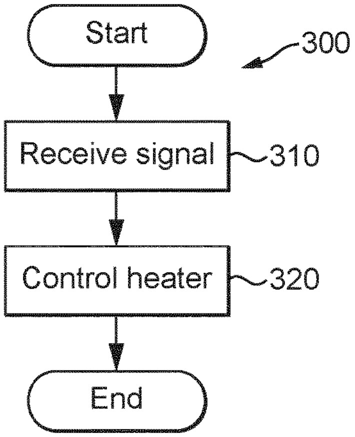
FIG. 3 shows a method according to an embodiment of the invention.

FIG. 3 illustrates a method 300 according to an embodiment of the invention. The method 300 is a method of controlling a gas sensor such as an oxygen sensor 160 of a vehicle. The method 300 particularly encompasses controlling heating of the oxygen sensor 160 of the vehicle according to an embodiment of the present invention.

The method 300 comprises a step 310 of receiving one or more signals 135, 220, 230, 240 indicative of the likelihood of future engine cranking. In some embodiments the one or more signals comprise the LFEC signal 135 which is received at the control module 110 and is indicative of one or more trigger events.

The method 300 comprises a step 320 of controlling, in dependence on the one or more signals 135, 220, 230, 240 indicative of the likelihood of future engine cranking, heating of the oxygen sensor 160 prior to the ICE cranking. In this way, the oxygen sensor 160 is at least partially heated prior to the ICE cranking. Advantageously heating of the oxygen sensor 160 prior to the ICE cranking reduces a time before closed-loop control of the ICE, such as of fuel used in combustion of the ICE, in dependence on the oxygen sensor is possible.

Figure 4:
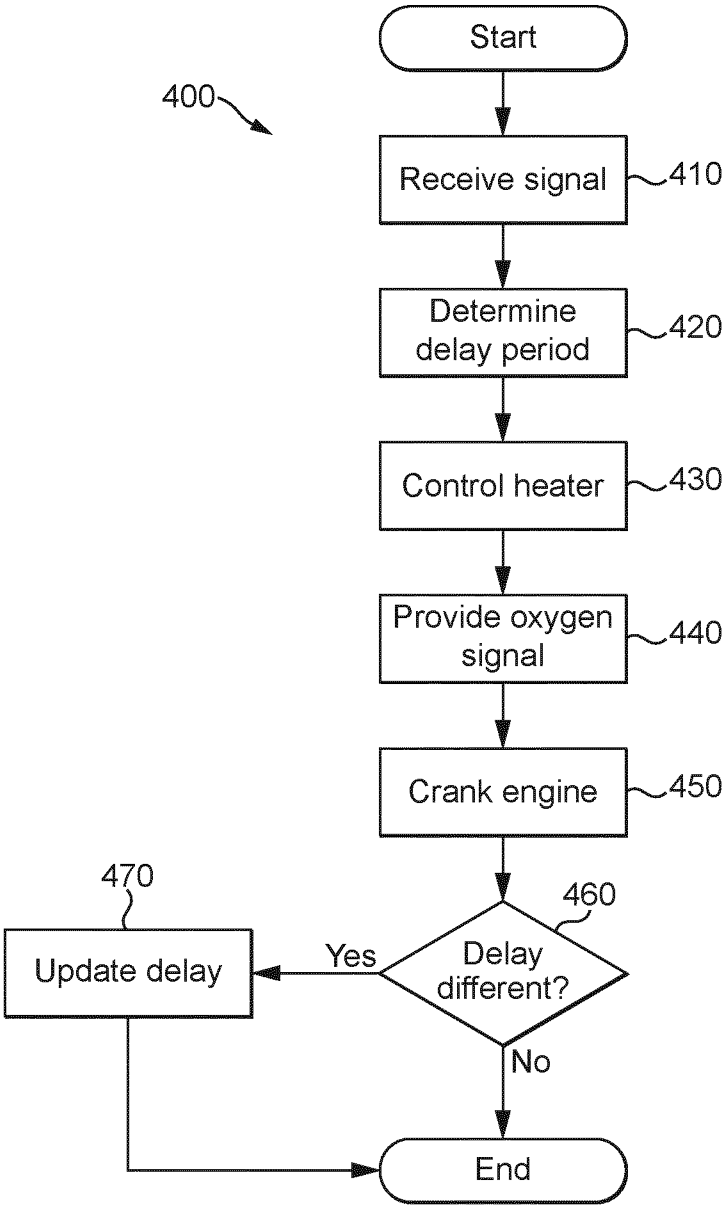
FIG. 4 shows a method according to a further embodiment of the invention.

FIG. 4 illustrates a method 400 according to an embodiment of the invention. The method 400 is a method of controlling a gas sensor such as an oxygen sensor 160 of a vehicle. The method 400 particularly encompasses controlling heating of the oxygen sensor 160 of the vehicle according to an embodiment of the present invention. The method of FIG. 4 will be described with reference to FIG. 5 which illustrates example timing of various signals.

The method 400 comprises a step 410 of receiving one or more signals 135, 220, 230, 240 indicative of a likelihood of future engine cranking. In some embodiments, the one or more signals 220, 230, 240 are received at a first controller such as the BCM 210 which is arranged to, in response, generate the LFEC signal 135 which is provided to the oxygen sensor control module 100. The LFEC signal 135 is received at the oxygen sensor control module 100 and is indicative of at least one trigger event, such as unlocking of the vehicle, opening an aperture of the vehicle, preheating of the vehicle commencing, etc. Such trigger events are those which occur when the ICE of the vehicle is not operating. In other embodiments, the oxygen sensor control module 100 may directly receive the one or more signals 220, 230, 240 indicative of a trigger event such as from the communication bus of the vehicle.

Figure 5:
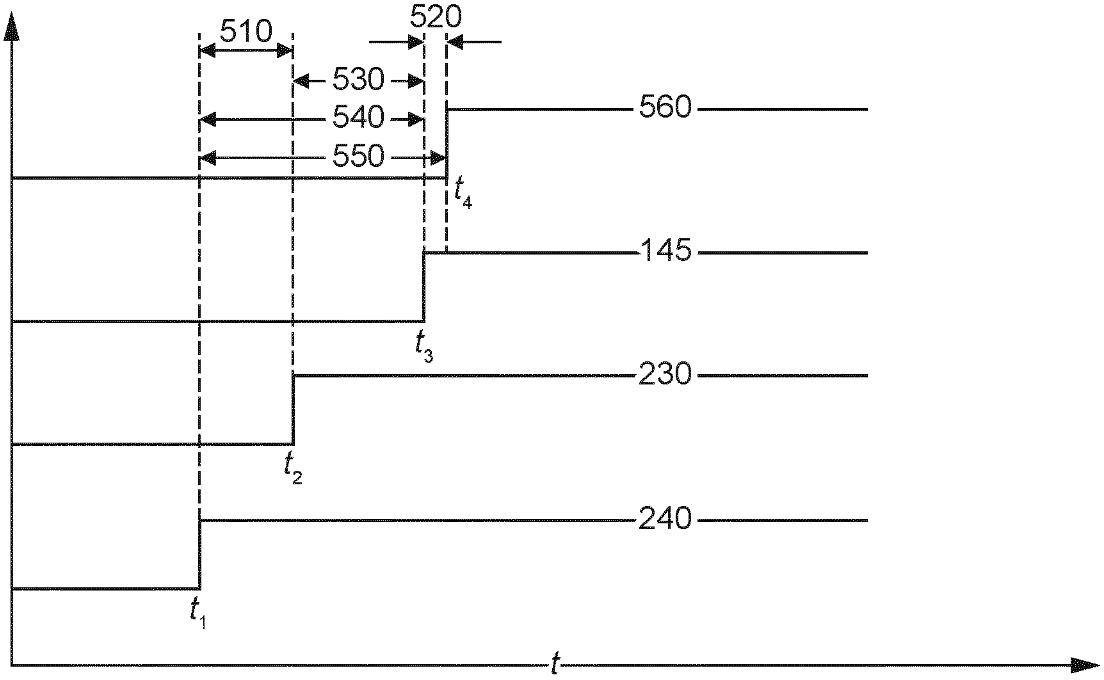
FIG. 5 illustrates timing according to an embodiment of the invention.

FIG. 5 illustrates two trigger events 240, 230 occurring, although it will be realised that this is merely an example and that other numbers of trigger events, such as one or more than one trigger event may be used. A first trigger event 240 corresponds to an initiation of pre-heating of at least a portion of the vehicle occurring, such as an interior of the vehicle. In the case of a hybrid vehicle having a battery to provide motive power for the vehicle, the pre-heating may be pre-heating of the battery. The first trigger event occurs at a time $t_1$ in the example illustrated. A second trigger event 230 corresponds to unlocking of the vehicle which occurs at a time $t_2$ in the example illustrated, wherein $t_2$ is after $t_1$ by a period of time indicated as 510 in FIG. 5.

The method 400 comprises a step 420 of determining a delay period. The delay period is determined as a period of time between at least some of the one or more trigger events 240, 230 and commencement of heating of the oxygen sensor 160. If heating of the oxygen sensor 160 were to occur excessively far in advance of cranking of the ICE, then energy is wasted and, furthermore, a lifetime of the heater 150 and/or oxygen sensor 160 may be reduced. Thus commencing heating of the oxygen sensor 160 at an appropriate time is useful. In some examples, the delay is a period of time from one trigger event such as one of the trigger events 240, 230, as indicated by one of periods 540, 530. In other examples, the delay is determined based upon a timing of the plurality of trigger events 240, 230 as explained below, such as both of the trigger events 240, 230.

A time of starting heating of the oxygen sensor 160 may be determined in some embodiments, as:

$$D=T_A-T_B$$

$$T_{start}=\beta(D_{t-1})+(1-\beta)D_t$$

Wherein $T_A$ is a total period of time between the preheating activation to engine cranking (between trigger event 240 and engine cranking 560) i.e. period 550 in FIG. 5, $T_B$ is a period of time between preheating activation to unlocking (between trigger events 240, 230) i.e. period 510 in FIG. 5, D is a difference or the delay between $T_A$ and $T_B$ i.e. a time between unlocking and engine cranking (between trigger event 230 and cranking), $T_{start}$ is a time at which the heating of the oxygen sensor 160 is activated i.e. time $t_3$ of signal 145 in FIG. 5, and β is a weighting factor.

D may be learned or at least updated over time in some embodiments. It is believed that an average D shall vary a little assuming a regular pattern of use of the vehicle 700, such as a commuting routine.

In some embodiments, the DDM 115 is arranged to operatively learn the delay between the one or more trigger events as indicated by the LFEC signal 135 and the starting of heating of the oxygen sensor 160 prior to cranking of the ICE. The difference in time between the one or more trigger events as indicated by the LFEC signal 135 and the cranking of the ICE may be learned and the heating of the oxygen sensor started a period of time prior to the learned cranking time. The heating may be started a period of time prior to cranking to allow the oxygen sensor 160 to reach a predetermined temperature at the time of cranking. The DDM 115 may be implemented as a machine learning module, for example, a neural network in order to adaptively learn or update the delay period in dependence on engine cranking history.

The method 400 comprises a step 430 of controlling the heater 150 to heat the oxygen sensor 160. The step of controlling the heater 150 comprises outputting the heating control signal 145 from the oxygen sensor control module 100. In FIG. 5, the heating control signal 145 is illustrated as occurring at a time $t_3$ after the delay period 530, 540 following the one or more trigger events 240, 230.

The heater 150 may heat the oxygen sensor 160 substantially to an operating temperature of the oxygen sensor 160. The operating temperature may be, for example a temperature of at least 600° C. or at least 700° C. In some embodiments, the operating temperature may be around 780° C. although it will be realised that this is merely an example and other operating temperatures may be used. Heating to the operating temperature of the oxygen sensor 160 may be used, although not exclusively, for non-dew point dependent oxygen sensors. In other embodiments, the heater 150 may heat the oxygen sensor 160 to a preparation temperature lower than the operating temperature of the oxygen sensor 160. The preparation temperature may be a temperature which enables the oxygen sensor 160 to be used effectively. In some embodiments, the preparation temperature may be over 300° C. such as around 400° C. The preparation temperature may be an elevated temperature at which dew or moisture is evaporated from the oxygen sensor 160. The preparation temperature may be useful with oxygen sensors which are dew-point dependent, such that the preparation temperature assists in reducing dew or moisture from the oxygen sensor 160.

In step 440 the oxygen signal 165 indicative of the one or more attributes of oxygen associated with the ICE is output by the oxygen sensor 160. The oxygen signal 165 enables closed-loop control of the ICE, such as fuel provided for combustion, to occur prior to, or at a time of, cranking of the ICE. The ICE is cranked for starting in step 450. As illustrated in FIG. 5, the ICE is cranked at a time $t_4$ subsequent to heating of the oxygen sensor 160 whilst the oxygen sensor 160 outputs the oxygen signal 165. In this way, it is possible to avoid, or at least reduce a time, of open-loop control of the ICE. In FIG. 5 a period of time between the heating signal 145 causing a commencement of heating of the oxygen sensor 160 and cranking of the ICE is indicated by period 520.

The method 400 may comprise, in some embodiments, a step of determining whether an anticipated delay 550 or period of time between the one or more trigger events 240, 230 and the cranking of the ICE at time $t_4$ corresponds substantially to an actual delay or period of time 550. In other words, it is determined whether a time at which heating of the oxygen sensor commenced was generally correct. If the delay or period of time to the cranking was different, for example, the ICE was cranked later than expected, step 470 comprises updating the expected delay. The expected delay may be updated at the DDM 115. Where the DDM 115 is based upon a learning algorithm, such as neural network, the actual delay may be provided as feedback to the neural network. Thus the delay period is adaptively updated in dependence on engine cranking history i.e. on information indicative of a time of cranking the ICE.

Figure 6:
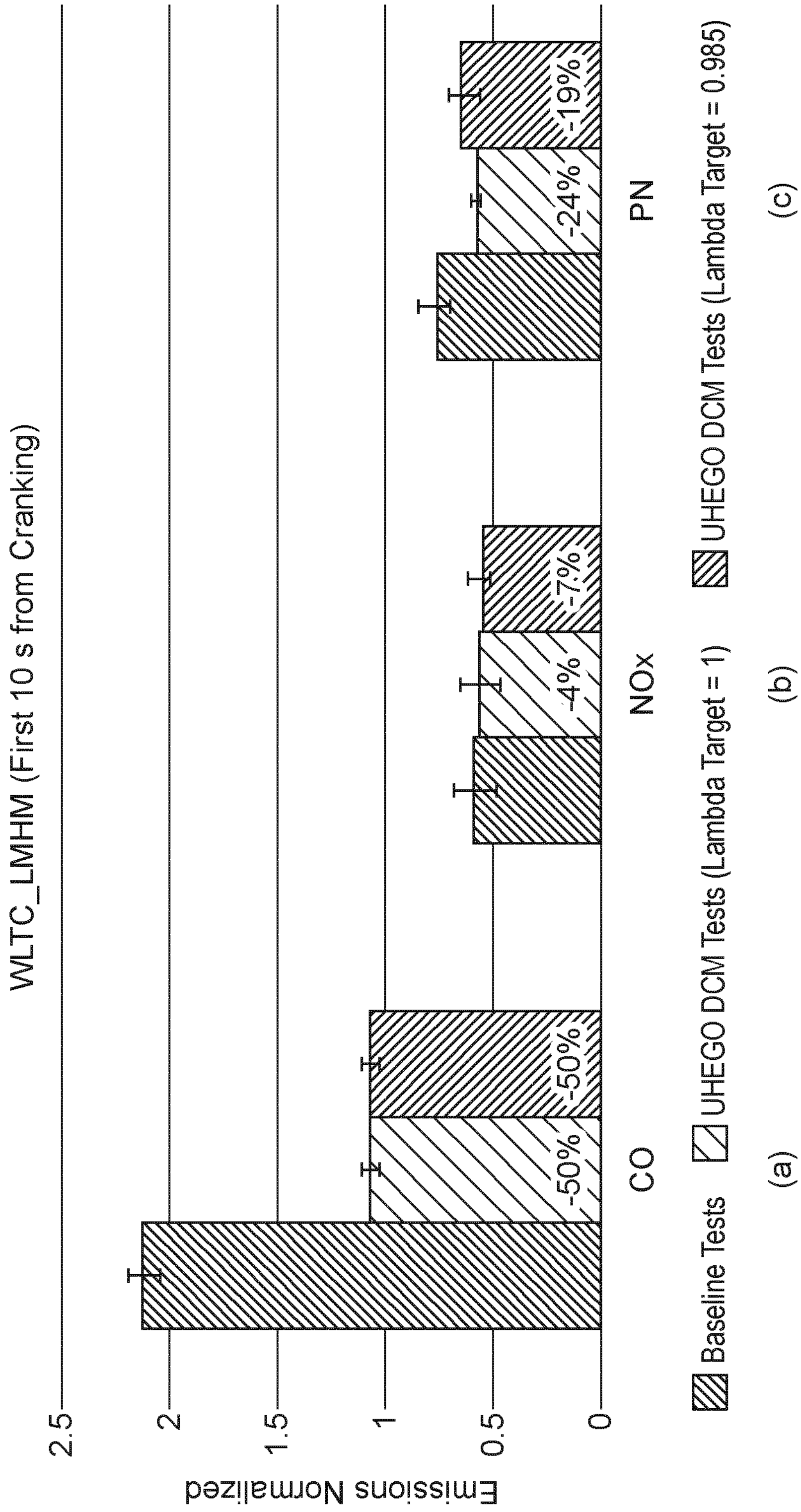
FIG. 6 illustrates experimental results for embodiments of the invention.

FIG. 6 illustrates normalised emissions from an ICE in a 10 second period after cranking for each of carbon monoxide (CO), nitrogen oxide (NOx) and particulates (PN). Baseline tests indicate emissions from the ICE without preheating of an oxygen sensor which results in open-loop control. It can be seen that results for a U HEGO oxygen sensor which is preheated prior to cranking to enable closed-loop control show an approximate 50% reduction in CO emissions, but also significant reductions in particulates of around 24% and a 4% reduction in NOx emissions. The tests indicate improvement for both Lambda=1 (stoichiometric combustion where sufficient air is present to completely burn fuel in a cylinder of the ICE), and also Lambda=0.985 (rich combustion).

Figure 7:
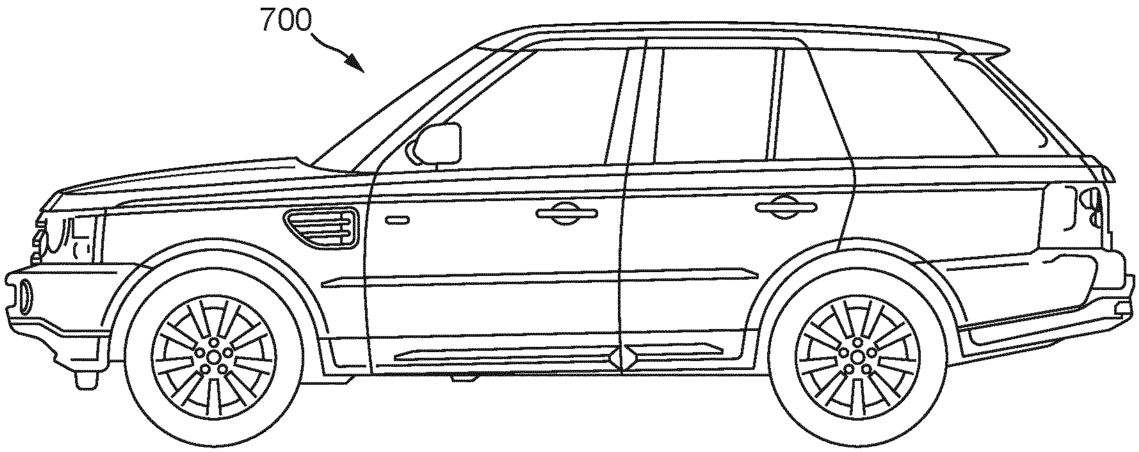
FIG. 7 shows a vehicle comprising a control module according to an embodiment of the invention.

FIG. 7 illustrates a vehicle comprising an oxygen sensor control module 100 according to an embodiment of the invention. The vehicle is a vehicle having an internal combustion engine associated with the oxygen sensor 160, as described above. It will be appreciated that embodiment of the invention may be useful with hybrid vehicles i.e. which comprise one or more electric machines to provide motive power to the vehicle 700. In some embodiments, the methods 300, 400 described above may comprise a step of determining whether the ICE of a hybrid vehicle is required to be cranked. For example, determining whether a battery of the vehicle is sufficiently charged to provide motive power for the vehicle. Where the vehicle 700 may move on battery power alone i.e. it is not necessary to crank the ICE, then it is determined that heating of the oxygen sensor is not necessary.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a machine readable storage storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. An oxygen sensor control module for a vehicle, comprising:

an electrical input for receiving one or more signals indicative of a likelihood of future engine cranking;

an electrical output to provide an output signal to cause activation of a heater associated with the oxygen sensor; and at least one electronic processor arranged to control the electrical output, in dependence on the one or more signals indicative of the likelihood of future engine cranking, to provide the output signal to cause activation of the heater associated with the oxygen sensor prior to the engine cranking, wherein the at least one electronic processor is arranged to determine a delay period between receiving the one or more signals indicative of the likelihood of future engine cranking and the output of the output signal to cause activation of the heater, and to output the output signal after the delay period.

2. The control module of claim 1, wherein each of the one or more signals indicative of the likelihood of future engine cranking is based on a respective trigger event.

3. The control module of claim 2, wherein the one or more signals indicative of the likelihood of future engine cranking based on a respective trigger event comprises one or more of:

a first signal indicative of a likelihood of future engine cranking is received in dependence on a trigger event corresponding to activation of pre-heating of the vehicle, a second signal indicative of a likelihood of future engine cranking is received in dependence on a trigger event corresponding to unlocking of the vehicle, or a third signal indicative of a likelihood of future engine cranking is received in dependence on a trigger event corresponding to opening of a vehicle access aperture.

4. The control module of claim 1, wherein a signal indicative of a likelihood of future engine cranking is received from a schedule means indicative of a vehicle user's schedule, or in dependence on a vehicle user's location.

5. The control module of claim 1, wherein the at least one electronic processor is arranged to control the electrical output to provide the output signal to cause activation of the heater associated with the oxygen sensor in dependence on receiving a plurality of signals indicative of the likelihood of future engine cranking.

6. The control module of claim 5, wherein the plurality of signals indicative of the likelihood of future engine cranking correspond to a plurality of trigger events.

7. The control module of claim 1, wherein the at least one electronic processor is arranged to adaptively update the delay period in dependence on engine cranking history.

8. The control module of claim 1, wherein the at least one electronic processor is arranged to determine whether engine cranking has occurred within a predetermined period of time from the electrical output providing the output signal to cause activation of the heater, and to control the electrical output to provide an output signal to cause a reduction in temperature of the heater if engine cranking has not occurred.

9. The control module of claim 1, wherein each of the one or more signals indicative of the likelihood of future engine cranking is based on a respective trigger event and the at least one electronic processor is arranged to:

determine a delay, or an expected delay, between the or each trigger event and cranking of the engine; and control the electrical output to provide the output signal to cause activation of the heater associated with the oxygen sensor in dependence on the determined delay.

10. The control module of claim 9, wherein the at least one electronic processor is arranged to periodically update an expected delay for the or each trigger event.

11. The control module of claim 10, wherein the at least one electronic processor is arranged to determine the expected delay for the or each trigger event based upon an artificial intelligence algorithm.

12. The control module of claim 11, wherein the artificial intelligence algorithm varies between users of the vehicle.

13. A vehicle comprising the controller of claim 1.

14. A method of controlling an oxygen sensor of a vehicle, comprising:

receiving one or more signals indicative of a likelihood of future engine cranking; and controlling, in dependence on the one or more signals indicative of the likelihood of future engine cranking, heating of the oxygen sensor prior to the engine cranking.

15. A non-transitory, computer-readable storage medium storing instructions that, when executed by one or more electronic processors, causes the one or more electronic processors to carry out the method according to claim 14.

* * * * *